(12) United States Patent
Murakami

(10) Patent No.: US 12,411,472 B2
(45) Date of Patent: Sep. 9, 2025

(54) NUMERICAL CONTROL DEVICE

(71) Applicant: FANUC CORPORATION, Yamanashi (JP)

(72) Inventor: Hiroki Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 505 days.

(21) Appl. No.: 17/905,399

(22) PCT Filed: Feb. 26, 2021

(86) PCT No.: PCT/JP2021/007452
§ 371 (c)(1),
(2) Date: Aug. 31, 2022

(87) PCT Pub. No.: WO2021/177180
PCT Pub. Date: Sep. 10, 2021

(65) Prior Publication Data
US 2023/0097923 A1 Mar. 30, 2023

(30) Foreign Application Priority Data
Mar. 4, 2020 (JP) .................................. 2020-037012

(51) Int. Cl.
*G05B 19/41* (2006.01)
(52) U.S. Cl.
CPC .... *G05B 19/41* (2013.01); *G05B 2219/34153* (2013.01)
(58) Field of Classification Search
CPC .......... G05B 19/41; G05B 2219/34153; G05B 2219/34083; G05B 2219/34085
See application file for complete search history.

(56) References Cited

U.S. PATENT DOCUMENTS 9,377,776 B2 * 6/2016 Nakamura ......... G05B 19/4103
2018/0120808 A1 * 5/2018 Murakami ......... G05B 19/4103
(Continued)

FOREIGN PATENT DOCUMENTS

JP H01-316185 A 12/1989
JP H09-265310 A 10/1997
(Continued)

OTHER PUBLICATIONS

International Search Report issued in PCT/JP2021/007452; mailed Apr. 27, 2021.

*Primary Examiner* — Charles Cai
(74) *Attorney, Agent, or Firm* — Studebaker Brackett PLLC

(57) ABSTRACT

Provided is a numerical control device for improving cycle time and machined surface quality. The numerical control device (1) comprises: a machining program reading unit (10) that generates, on the basis of a read machining program, a tool center point sequence indicating a path of a center point of a tool of a machining tool; an interpolation control unit (11) that interpolates the tool center point sequence generated by the machining program reading unit (10); a kinematic conversion unit (12) that performs coordinate-conversion on the tool center point sequence interpolated by the interpolation control unit (11) to obtain a control point sequence indicating a path of a control point by which the position of the tool is determined; a smoothing application unit (13) that performs smoothing by performing smoothing processing on the control point sequence, obtained by the kinematic conversion unit (12), with predetermined parameters; and a drive control unit (14) that controls driving of a machining tool A on the basis of the control point sequence smoothed by the smoothing application unit (13).

5 Claims, 9 Drawing Sheets

(56) References Cited

U.S. PATENT DOCUMENTS

2021/0001483 A1\* 1/2021 Milenkovic ............ B25J 9/1666
2021/0001484 A1\* 1/2021 Bogart ................... B25J 13/088

FOREIGN PATENT DOCUMENTS

| JP | 2008-225825 A | 9/2008 |
| JP | 2009-301232 A | 12/2009 |
| JP | 2009-545826 A | 12/2009 |
| JP | 2018-073097 A | 5/2018 |
| JP | 2018-120543 A | 8/2018 |
| JP | 2019-082851 A | 5/2019 |
| JP | 2020-027410 A | 2/2020 |
| JP | 2020-077311 A | 5/2020 |
| WO | 2012/056554 A1 | 5/2012 |

\* cited by examiner

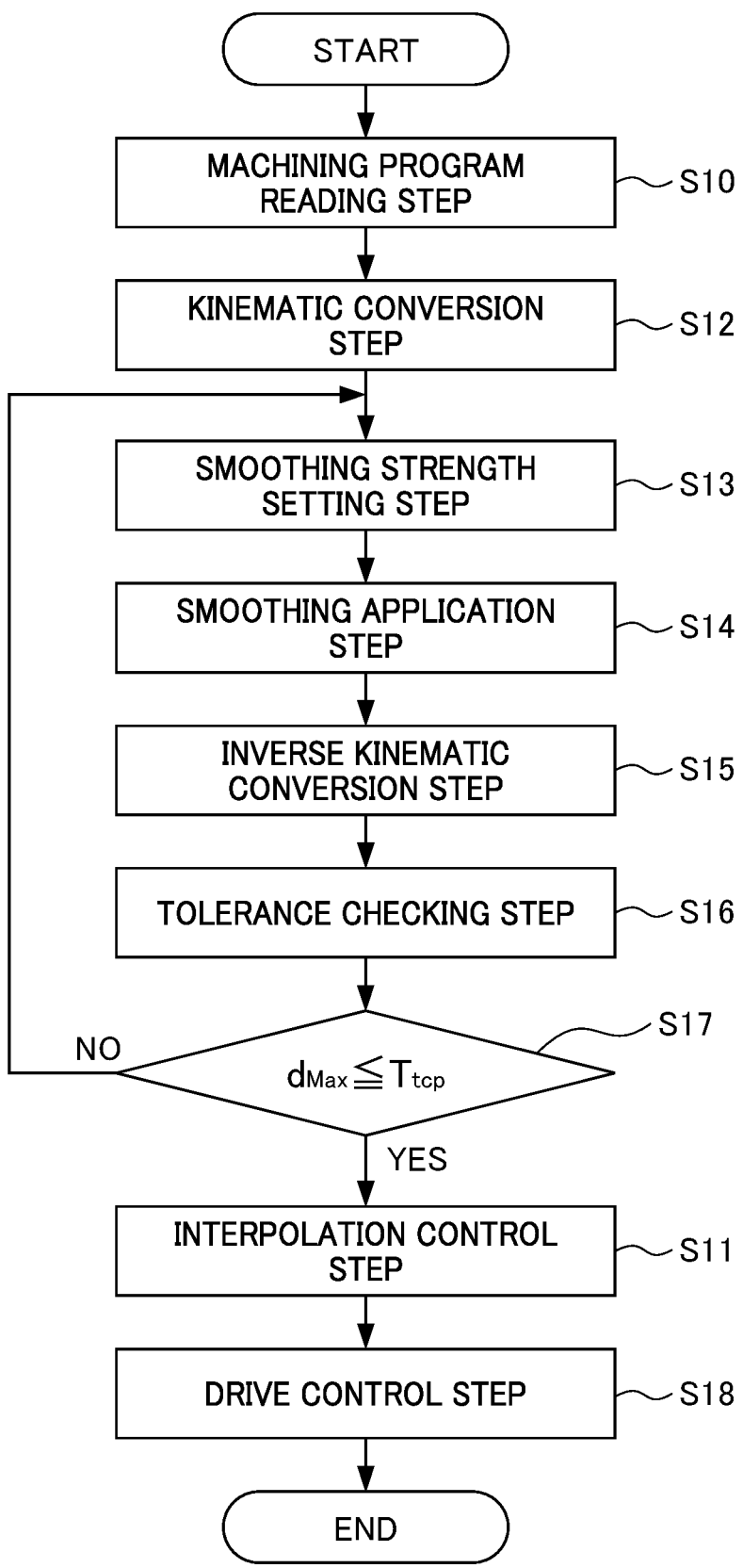

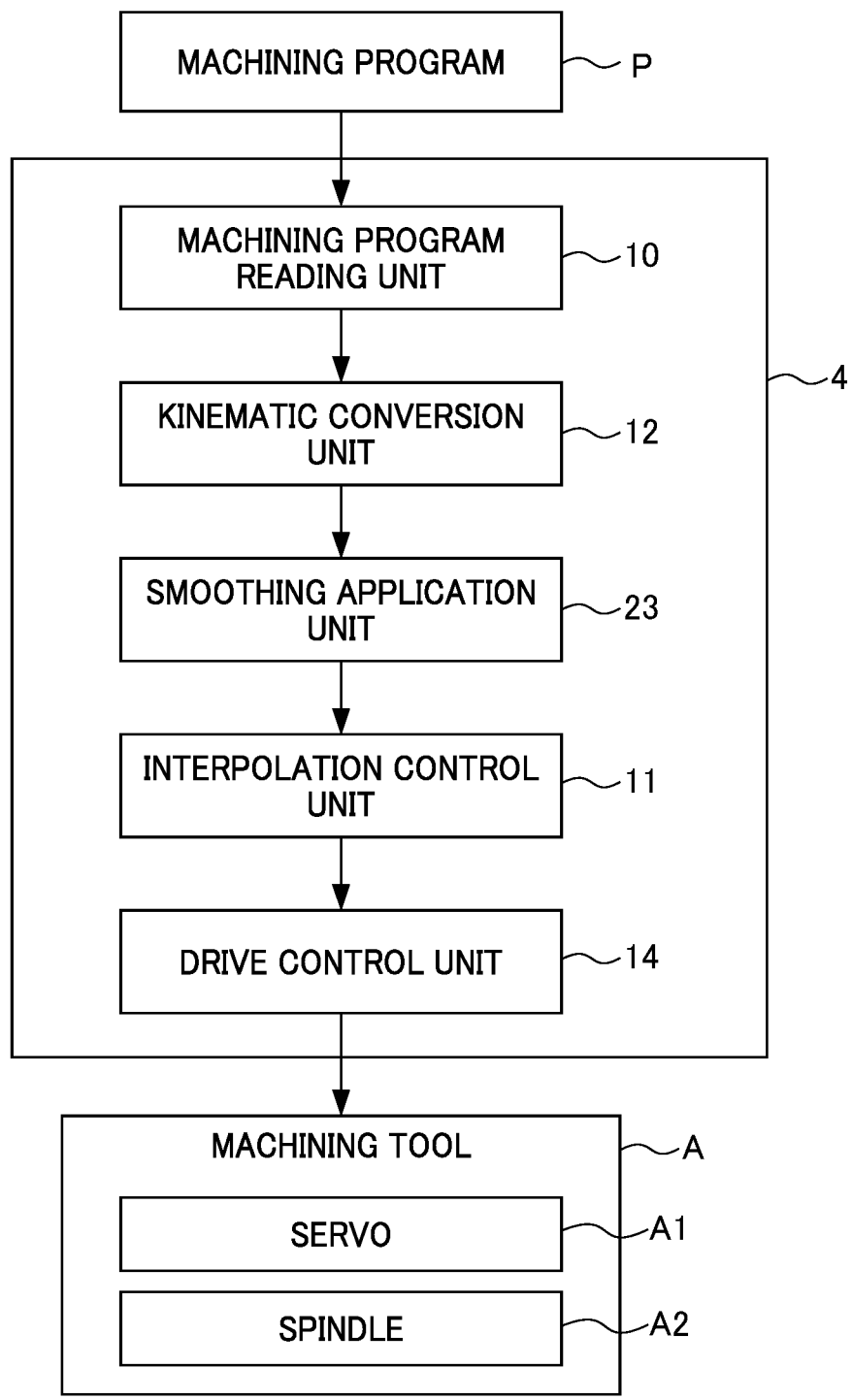

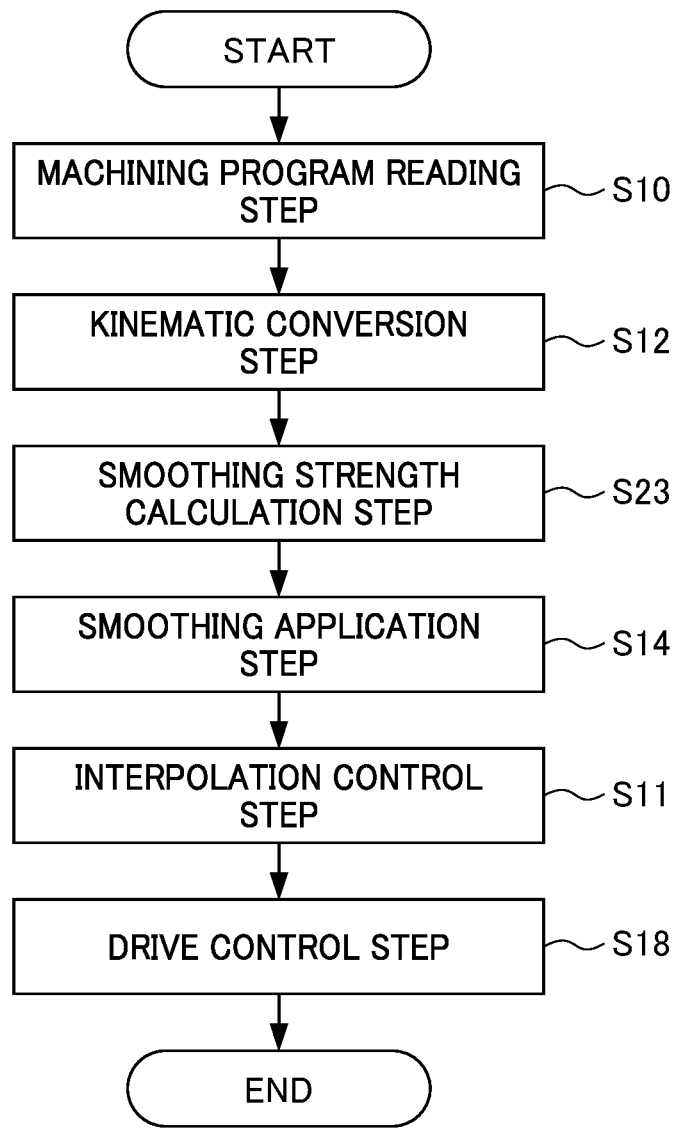

NUMERICAL CONTROL DEVICE

TECHNICAL FIELD

The present disclosure relates to a numerical control device.

BACKGROUND ART

In the related art, techniques have been adopted for smoothing a path specified by a tool center point to be brought into contact with a workpiece, in a numerical control device of a machining tool (for example, see Japanese Unexamined Patent Application, Publication No. 2018-073097). In Japanese Unexamined Patent Application, Publication No. 2018-073097, as the smoothing techniques, there are disclosed well-known techniques based on Bezier curves, B-spline curves, NURBS curves, simple averages, weighted averages, and the like. In these well-known techniques, the tolerance (allowance) checking is performed after the smoothing, and if the tolerance is exceeded (if the tolerance is not satisfied), the parameter is adjusted by changing the parameter to fall within the tolerance.

Patent Document 1: Japanese Unexamined Patent Application, Publication No. 2018-073097

DISCLOSURE OF THE INVENTION

Problems to be Solved by the Invention

However, in the above-described well-known techniques, a path specified by a tool center point different from a control point defining a position of the tool is smoothed, and therefore it is necessary to perform coordinate-conversion (from a coordinate system of the tool center point to a coordinate system of the control point) of the smoothed path. As a result, a path specified by the control point is not smooth in some cases. In this case, deceleration occurs during the operation of the machining tool, which causes lowering of the cycle time and deterioration of the machined surface quality.

Accordingly, it is desired to provide a numerical control device that makes it possible to improve a cycle time and machined surface quality.

Means for Solving the Problems

An aspect of the present disclosure provides a numerical control device comprising a machining program reading unit that generates, on a basis of a read machining program, a tool center point sequence indicating a path of a tool center point of a machining tool, an interpolation control unit that interpolates the tool center point sequence generated by the machining program reading unit, a kinematic conversion unit that performs coordinate-conversion on the tool center point sequence interpolated by the interpolation control unit to obtain a control point sequence indicating a path of a control point defining a position of the tool, a smoothing application unit that performs smoothing by performing smoothing processing on the control point sequence, obtained by the kinematic conversion unit, with a predetermined parameter, and a drive control unit that controls driving of the machining tool on the basis of the control point sequence smoothed by the smoothing application unit.

Effects of the Invention

According to an aspect of the present disclosure, there can be provided a numerical control device that makes it possible to improve a cycle time and machined surface quality.

BRIEF DESCRIPTION OF THE DRAWINGS

FIG. 7 is a flowchart illustrating a process executed by the numerical control device according to the third embodiment;

FIG. 8 is a block diagram illustrating a functional configuration of a numerical control device according to a fourth embodiment; and FIG. 9 is a flowchart illustrating a process executed by the numerical control device according to the fourth embodiment.

PREFERRED MODE FOR CARRYING OUT THE INVENTION

Hereinafter, numerical control devices 1, 2, 3, and 4 according to embodiments will be described with reference to the drawings. In the description of a second embodiment and subsequent embodiments, the same reference symbols will be assigned to configurations shared with the other embodiments, and the description thereof will be omitted.

First Embodiment

Figure 1:
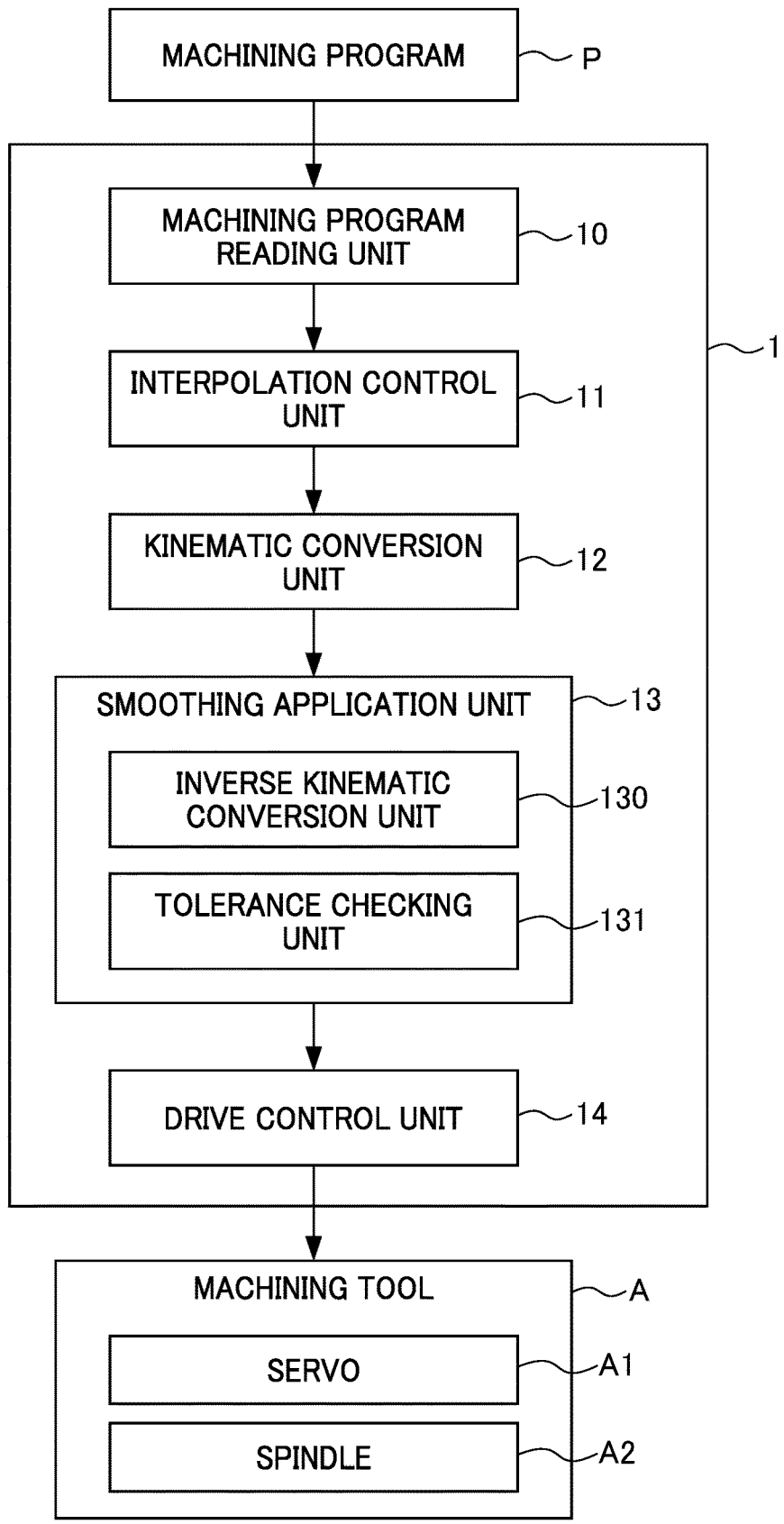
FIG. 1 is a block diagram illustrating a functional configuration of a numerical control device according to a first embodiment.
Figure 2:
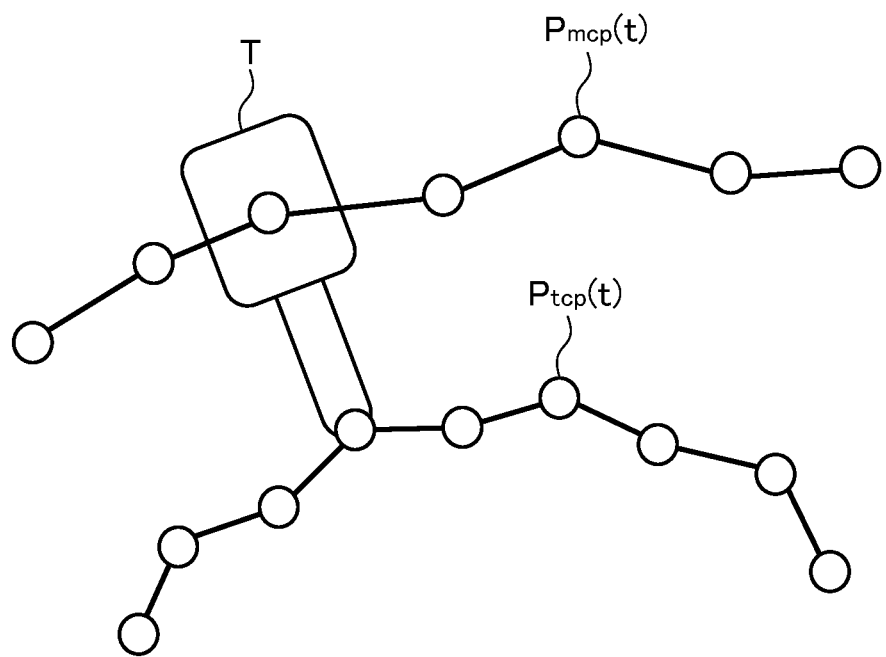
FIG. 2 is a schematic diagram illustrating a path of a tool of a machining tool to be controlled by the numerical control device according to the first embodiment.

First, a configuration of the numerical control device 1 will be described with reference to FIGS. 1 and 2. FIG. 1 is a block diagram illustrating a functional configuration of the numerical control device 1. FIG. 2 is a schematic diagram illustrating a path of a tool T of a machining tool A to be controlled by the numerical control device 1.

The numerical control device 1 illustrated in FIG. 1 includes an arithmetic processing unit (not shown) such as a central processing unit (CPU), a main storage unit (not shown) such as a random access memory (RAM) for storing data that the arithmetic processing unit temporarily requires to execute programs, an auxiliary storage unit (not shown) such as a hard disk drive (HDD) and a solid state drive (SSD) that stores various programs such as a machining program P, an input unit (not shown) such as a keyboard, an output unit (not shown) such as a monitor, and a communication unit (not shown) that communicates with the machining tool A.

The CPU (not shown) included in the numerical control device 1 executes various programs to thereby implement various functions of a machining program reading unit 10, an interpolation control unit 11, a kinematic conversion unit 12, a smoothing application unit 13, a drive control unit 14, and the like.

The machining program reading unit 10 generates, on the basis of a read machining program P, a tool center point sequence $P_{tcp}(t)$ indicating a path of a center point of a tool T (see FIG. 2) of the machining tool A. The tool center point sequence $P_{tcp}(t)$ is formed by expressing a path by means of parametric curves, the path being represented by straight lines, arcs, parametric curves, and the like. The tool center point sequence $P_{tcp}(t)$ is represented by a five-dimensional vector containing X, Y, and Z axes coordinate values and coordinate values of rotary axes B and C when the machining tool A is a 5-axis machining tool, for example. Note that t is a parameter of the parametric curve.

The interpolation control unit 11 interpolates the tool center point sequence $P_{tcp}(t)$ generated by the machining program reading unit 10.

The kinematic conversion unit 12 performs coordinate-conversion (kinematic conversion) on the tool center point sequence $P_{tcp}(t)$ interpolated by the interpolation control unit 11 to obtain a control point sequence $P_{mcn}(t)$ indicating a path of a control point defining a position of the tool T (see FIG. 2). $P_{mcn}(t)$ can be represented as $P_{mcn}(t)=M \cdot P_{tcp}(t)$. This $P_{mcn}(t)$ is represented by a five-dimensional vector containing X, Y, and Z axes coordinate values and coordinate values of rotary axes B and C when the machining tool A is a 5-axis machining tool, for example. M is a conversion matrix that performs kinematic conversion.

The smoothing application unit 13 performs smoothing by performing smoothing processing on the control point sequence $P_{mcn}(t)$, obtained by the kinematic conversion unit 12, with a predetermined parameter u. Thus, the smoothed control point sequence $Q_{mcn}(t)$ is obtained. $Q_{mcn}(t)$ can be represented as $Q_{mcn}(t)=S(u) \cdot P_{mcn}(t)=S(u) \cdot M \cdot P_{tcp}(t)$. A predetermined parameter u is a variable representing the strength of smoothing. S is an operation for performing the smoothing processing. In S(u), the smoothing processing is not performed at the time of u=0, and the effect of the smoothing processing increases with an increase in u, resulting in the smoothed path, whereas a deviation from an original path increases. For example, when S is a linear filter, its time constant corresponds to u. Note that u may be a fixed value or may be dependent on a parameter t. Making u dependent on the parameter t makes it possible to suppress the effect of the smoothing processing at the corner portion and increase the effect of the smoothing processing at a free-form curve portion.

Specifically, the smoothing application unit 13 includes an inverse kinematic conversion unit 130, and a tolerance checking unit 131, and determines a predetermined parameter u by means of numerical calculation.

The inverse kinematic conversion unit 130 performs coordinate-conversion (inverse kinematic conversion) on the control point sequence $Q_{mcn}(t)$ smoothed by the smoothing application unit 13 to obtain the smoothed tool center point sequence $Q_{tcp}(t)$. $Q_{tcp}(t)$ can be represented as $Q_{tcp}(t)=M^{-1} \cdot Q_{mcn}(t)=M^{-1} \cdot S(u) \cdot P_{mcn}(t)=M^{-1} \cdot S(u) \cdot M \cdot P_{tcp}(t)$. $M^{-1}$ is a conversion matrix that performs inverse kinematic conversion, and is a conversion matrix that performs inverse conversion of M.

The tolerance checking unit 131 performs tolerance checking on the basis of a difference between the tool center point sequence $P_{tcp}(t)$ before the coordinate-conversion is performed by the kinematic conversion unit 12 and the smoothed tool center point sequence $Q_{tcp}(t)$ obtained by the inverse kinematic conversion unit 130. The difference between $P_{tcp}(t)$ and $Q_{tcp}(t)$ can be represented as $d(t)=|Q_{tcp}(t)-P_{tcp}(t)|$. A maximum value of u (maximum value of the smoothing strength) satisfying $d_{Max} \leq T_{tcp}$ is calculated, where $d_{Max}$ is a maximum value of d(t) and $T_{tcp}$ is a preset tolerance. This can obtain a smooth path in which the deviation is within $T_{tcp}$ and the smoothing processing is performed.

The drive control unit 14 controls driving of the machining tool A on the basis of the smoothed control point sequence $Q_{mcn}(t)$. Specifically, the drive control unit 14 controls, on the basis of the smoothed control point sequence $Q_{mcn}(t)$, a servo driving unit (not shown) that drives a servo A1 and a spindle driving unit (not shown) that drives a spindle A2, the servo A1 and the spindle A2 being included in the machining tool A.

Figure 3:
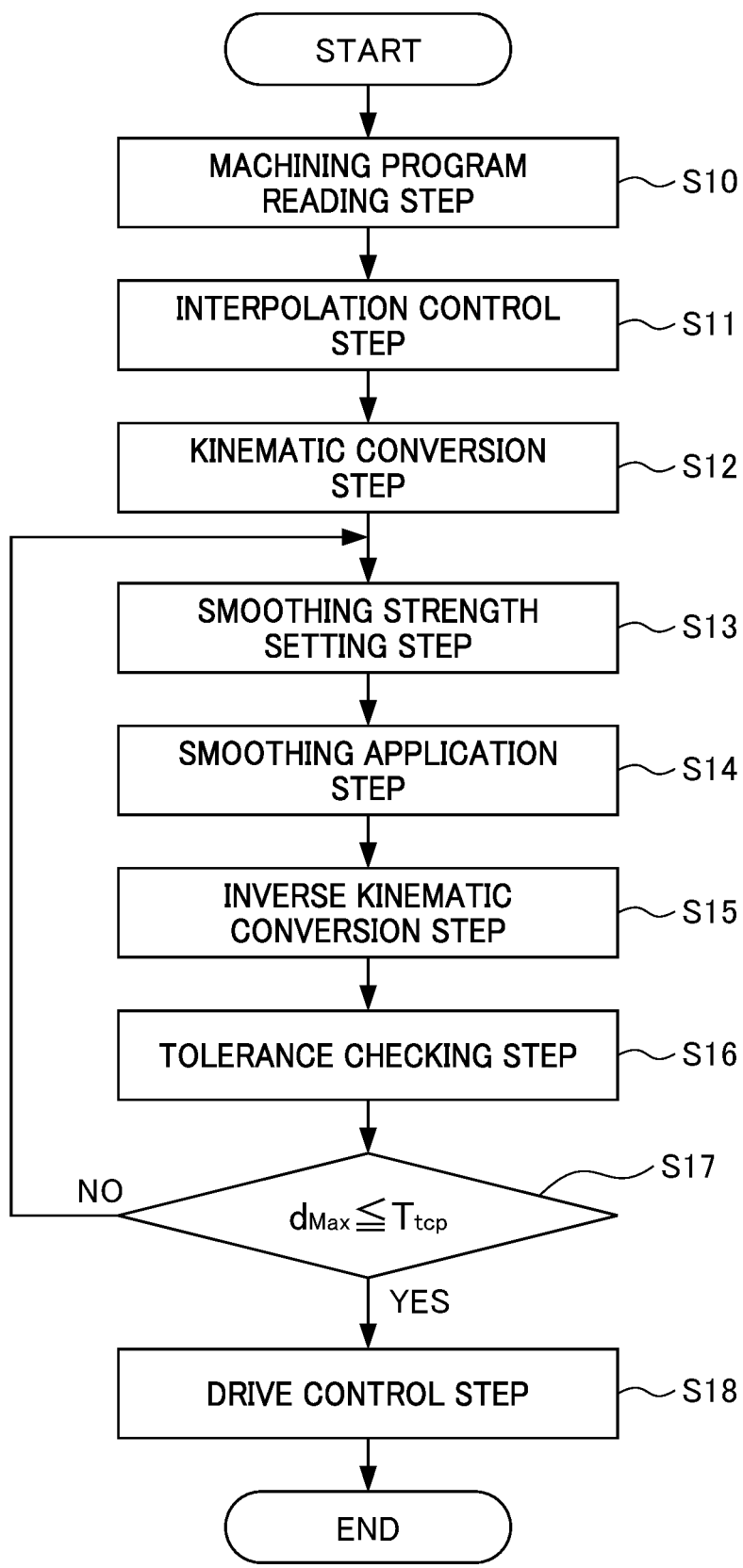
FIG. 3 is a flowchart illustrating a process executed by the numerical control device according to the first embodiment.

Next, a process executed by the numerical control device 1 will be described with reference to FIG. 3. FIG. 3 is a flowchart illustrating the process executed by the numerical control device 1.

As illustrated in FIG. 3, the process executed by the numerical control device 1 includes a machining program reading step S10, an interpolation control step S11, a kinematic conversion step S12, a smoothing strength setting step S13, a smoothing application step S14, an inverse kinematic conversion step S15, a tolerance checking step S16, and a drive control step S18.

In the machining program reading step S10, a tool center point sequence $P_{tcp}(t)$ indicating a path of a tool center point of a tool T of a machining tool A is generated on the basis of a read machining program P.

In the interpolation control step S11, the tool center point sequence $P_{tcp}(t)$ generated in the machining program reading step S10 is interpolated.

In the kinematic conversion step S12, coordinate-conversion is performed on the tool center point sequence $P_{tcp}(t)$ interpolated in the interpolation control step S11 to obtain a control point sequence $P_{mcn}(t)$ indicating a path of a control point defining a position of the tool T.

In the smoothing strength setting step S13, a parameter u is set which is a value of the smoothing strength. A small value is set for the parameter u at first, and the value to be set is gradually increased.

In the smoothing application step S14, smoothing is performed by performing smoothing processing on the control point sequence $P_{mcn}(t)$, obtained by the kinematic conversion unit 12, with the predetermined parameter u obtained in the previous step.

In the inverse kinematic conversion step S15, coordinate-conversion is performed on the control point sequence $Q_{mcn}(t)$ smoothed in the smoothing application step S14 to obtain the smoothed tool center point sequence $Q_{tcp}(t)$.

In the tolerance checking step 316, tolerance checking is performed on the basis of a difference between the tool center point sequence $P_{tcp}(t)$ before the coordinate-conversion is performed in the kinematic conversion step S12 and the smoothed tool center point sequence $Q_{tcp}(t)$ obtained in the inverse kinematic conversion step S15.

By repeatedly executing Steps S13 to S16 according to a result of the determination in S17, a maximum value of u satisfying $d_{Max} \leq T_{tcp}$ is calculated by means of numerical calculation, and the control point sequence $Q_{mcn}(t)$ that is subjected to the smoothing processing with the maximum value of u is obtained.

In the drive control step S18, driving of the machining tool A is controlled on the basis of the finally obtained control point sequence $Q_{mcn}(t)$.

In this way, a numerical control device 1 includes a machining program reading unit 10 that generates, on a basis of a read machining program P, a tool center point sequence $P_{tcp}(t)$ indicating a path of a center point of a tool T of a machining tool A, an interpolation control unit 11 that interpolates the tool center point sequence $P_{tcp}(t)$ generated by the machining program reading unit 10, a kinematic conversion unit 12 that performs coordinate-conversion on the tool center point sequence $P_{tcp}(t)$ interpolated by the interpolation control unit 11 to obtain a control point sequence $P_{mcn}(t)$ indicating a path of a control point defining a position of the tool T, a smoothing application unit 13 that performs smoothing by performing smoothing processing on the control point sequence $P_{mcn}(t)$, obtained by the kinematic conversion unit 12, with a predetermined parameter u, and a drive control unit 14 that controls driving of the machining tool A on the basis of the control point sequence $Q_{mcn}(t)$ smoothed by the smoothing application unit 13.

In addition, in the numerical control device 1, the smoothing application unit 13 includes an inverse kinematic conversion unit 130 that performs coordinate-conversion on the control point sequence $Q_{mcn}(t)$ smoothed by the smoothing application unit 13 to obtain the smoothed tool center point sequence $Q_{tcp}(t)$, and a tolerance checking unit 131 that performs tolerance checking on the basis of a difference between the tool center point sequence $P_{tcp}(t)$ before the coordinate-conversion is performed by the kinematic conversion unit 12 and the smoothed tool center point sequence $Q_{tcp}(t)$ obtained by the inverse kinematic conversion unit 130, and preferably determines the predetermined parameter u by means of numerical calculation.

According to the numerical control device 1 according to the present embodiment, applying smoothing to the control point enables smooth motion of the spindle. This makes it possible to prevent the control point from rapidly operating, whereby the cycle time and the machining surface quality can be improved.

Second Embodiment

Figure 4:
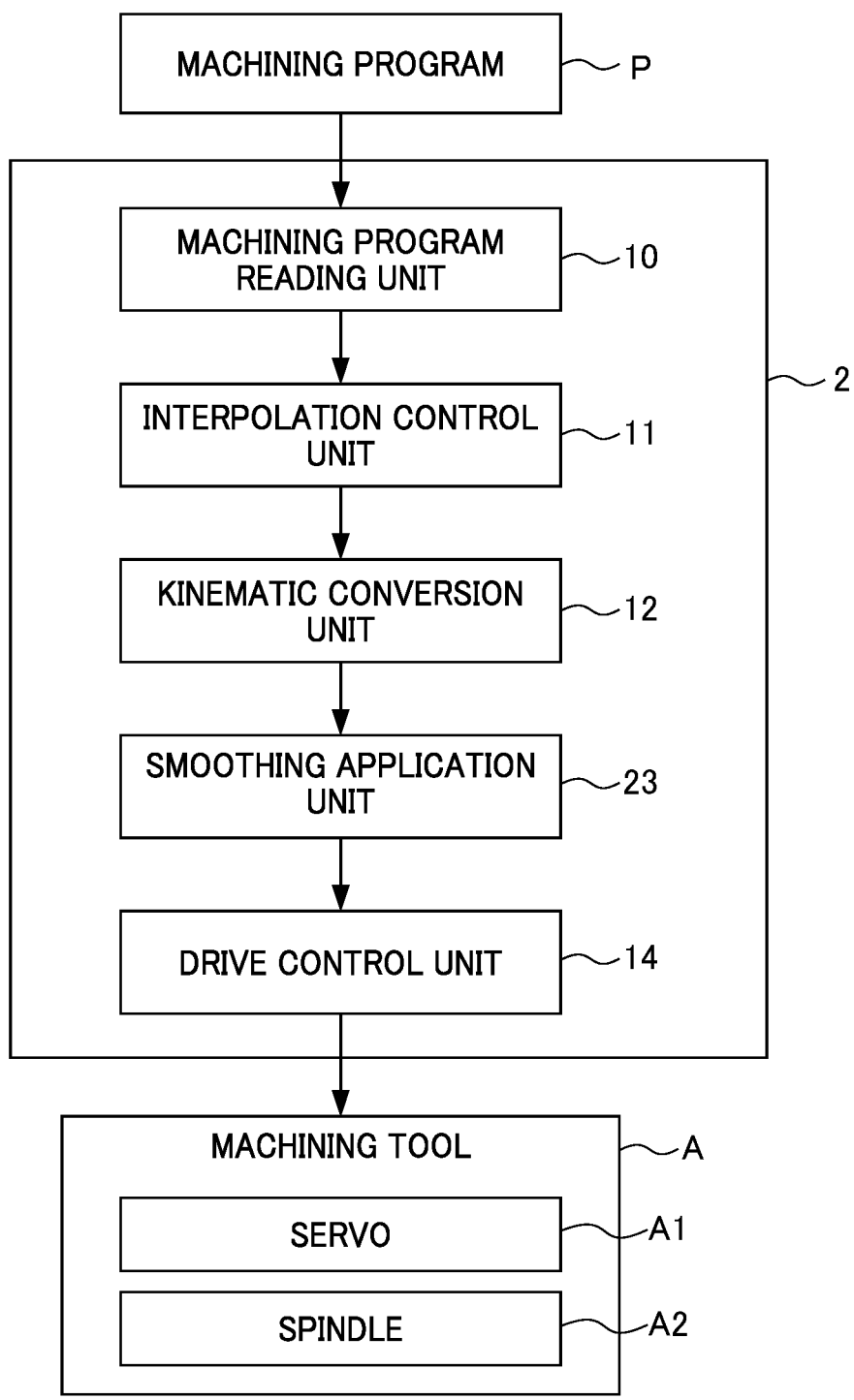
FIG. 4 is a block diagram illustrating a functional configuration of a numerical control device according to a second embodiment.

Next, a configuration of the numerical control device 2 will be described with reference to FIG. 4. FIG. 4 is a block diagram illustrating a functional configuration of the numerical control device 2. The present embodiment is different from the first embodiment in that a smoothing application unit 23 that analytically determines a predetermined parameter u is provided instead of the smoothing application unit 13 that determines a predetermined parameter u by means of numerical calculation.

As illustrated in FIG. 4, a CPU (not shown) included in the numerical control device 2 executes various programs to thereby implement various functions of the smoothing application unit 23, and the like.

The smoothing application unit 23 performs smoothing by performing smoothing processing on a control point sequence $P_{mcn}(t)$, obtained by a kinematic conversion unit 12, with a predetermined parameter u. Note that the smoothing application unit 23 analytically determines the predetermined parameter u. That is, the smoothing application unit 23 calculates u satisfying $d_{Max}=T_{tcp}$.

Figure 5:
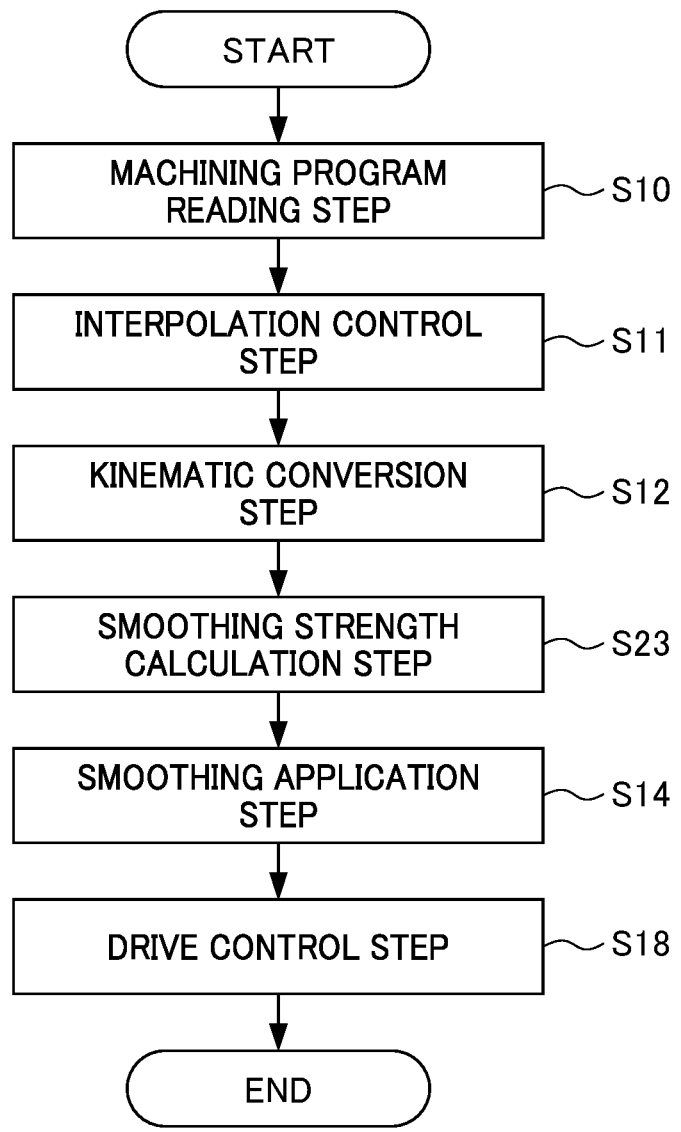
FIG. 5 is a flowchart illustrating a process executed by the numerical control device according to the second embodiment.

Next, a process executed by the numerical control device 2 will be described with reference to FIG. 5. FIG. 5 is a flowchart illustrating the process executed by the numerical control device 2.

As illustrated in FIG. 5, the process executed by the numerical control device 2 includes a machining program reading step S10, an interpolation control step S11, a kinematic conversion step S12, a smoothing strength calculation step S23, a smoothing application step S14, and a drive control step S18.

In the smoothing strength calculation step S23, a parameter u (u satisfying $d_{Max}=T_{tcp}$) is calculated which is a value of the smoothing strength. Note that the other steps are the same as those in the first embodiment.

In this way, a numerical control device 2 includes a machining program reading unit 10 that generates, on a basis of a read machining program P, a tool center point sequence $P_{tcp}(t)$ indicating a path of a center point of a tool T of a machining tool A, an interpolation control unit 11 that interpolates the tool center point sequence $P_{tcp}(t)$ generated by the machining program reading unit 10, a kinematic conversion unit 12 that performs coordinate-conversion on the tool center point sequence $P_{tcp}(t)$ interpolated by the interpolation control unit 11 to obtain a control point sequence $P_{mcn}(t)$ indicating a path of a control point defining a position of the tool T, a smoothing application unit 23 that performs smoothing by performing smoothing processing on the control point sequence $P_{mcn}(t)$, obtained by the kinematic conversion unit 12, with a predetermined parameter u, and a drive control unit 14 that controls driving of the machining tool A on the basis of the control point sequence $Q_{mcn}(t)$ smoothed by the smoothing application unit 23.

In the numerical control device 2, the smoothing application unit 23 preferably analytically determines the predetermined parameter u.

According to the numerical control device 2 according to the present embodiment, applying smoothing to the control point enables smooth motion of the spindle. This makes it possible to prevent the control point from rapidly operating, whereby the cycle time and the machining surface quality can be improved.

Third Embodiment

Figure 6:
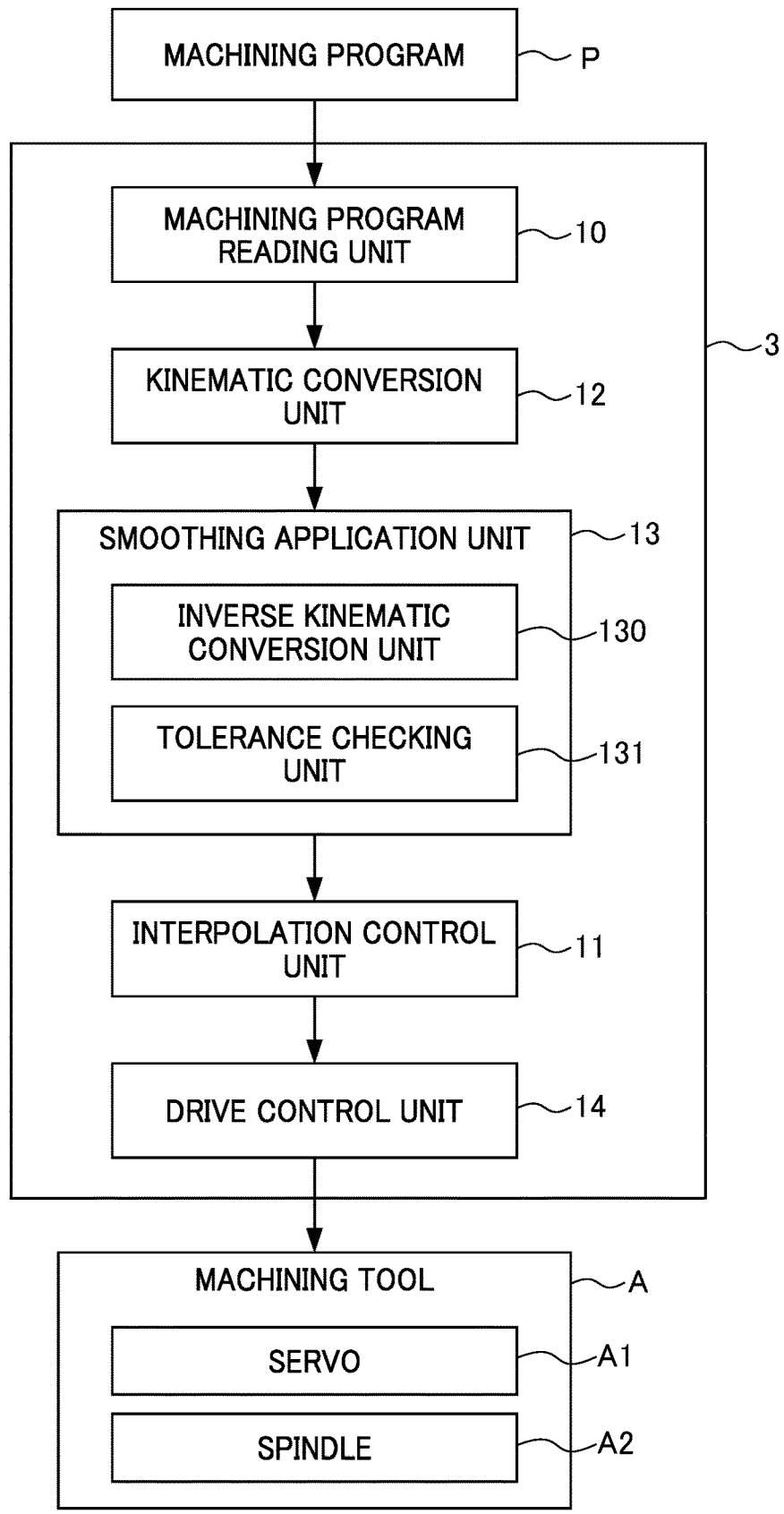
FIG. 6 is a block diagram illustrating a functional configuration of a numerical control device according to a third embodiment.

Next, a configuration of the numerical control device 3 will be described with reference to FIG. 6. FIG. 6 is a block diagram illustrating a functional configuration of the numerical control device 3. The present embodiment is different from the first embodiment in that a control point sequence $Q_{mcn}(t)$ on which the smoothing processing is performed is interpolated instead of interpolating the tool center point sequence $P_{tcp}(t)$ before the kinematic conversion is performed.

As illustrated in FIG. 6, the CPU (not shown) included in the numerical control device 3 executes various programs to thereby implement various functions of a machining program reading unit 10, a kinematic conversion unit 12, a smoothing application unit 13, an interpolation control unit 11, a drive control unit 14, and the like.

The kinematic conversion unit 12 performs coordinate-conversion on the tool center point sequence $P_{tcp}(t)$ generated by the machining program reading unit 10 to obtain a control point sequence $P_{mcn}(t)$ indicating a path of a control point defining a position of the tool T (see FIG. 2).

The interpolation control unit 11 interpolates the control point sequence $Q_{mcn}(t)$ smoothed by the smoothing application unit 13.

The drive control unit 14 controls driving of the machining tool A on the basis of the interpolated control point sequence $Q_{mcn}(t)$.

Next, a process executed by the numerical control device 3 will be described with reference to FIG. 7. FIG. 7 is a flowchart illustrating the process executed by the numerical control device 3.

As illustrated in FIG. 7, the process executed by the numerical control device 3 includes a machining program reading step S10, a kinematic conversion step S12, a smoothing strength setting step S13, a smoothing application step S14, an inverse kinematic conversion step S15, a tolerance checking step S16, an interpolation control step S11, and a drive control step S18.

In the kinematic conversion step S12, coordinate-conversion is performed on the tool center point sequence $P_{tcp}(t)$ generated in the machining program reading step S10 to obtain a control point sequence $P_{mcn}(t)$ indicating a path of a control point defining a position of the tool T.

In the interpolation control step S11, a finally obtained control point sequence $Q_{mcn}(t)$ is interpolated.

In the drive control step S18, driving of the machining tool A is controlled on the basis of the control point sequence $Q_{mcn}(t)$ interpolated in the interpolation control step S11. Note that the other steps are the same as those in the first embodiment.

In this way, a numerical control device 3 includes a machining program reading unit 10 that generates, on a basis of a read machining program P, a tool center point sequence $P_{tcp}(t)$ indicating a path of a tool center point of a tool T of a machining tool A, a kinematic conversion unit 12 that performs coordinate-conversion on the tool center point sequence $P_{tcp}(t)$ generated by the machining program reading unit 10 to obtain a control point sequence $P_{mcn}(t)$ indicating a path of a control point defining a position of the tool T, a smoothing application unit 13 that performs smoothing by performing smoothing processing on the control point sequence $P_{mcn}(t)$, obtained by the kinematic conversion unit 12, with a predetermined parameter u, an interpolation control unit 11 that interpolates the control point sequence $Q_{mcn}(t)$ smoothed by the smoothing application unit 13, and a drive control unit 14 that controls driving of the machining tool A on the basis of the control point sequence $Q_{mcn}(t)$ interpolated by the interpolation control unit 11.

In addition, in the numerical control device 3, the smoothing application unit 13 includes an inverse kinematic conversion unit 130 that performs coordinate-conversion on the control point sequence $Q_{mcn}(t)$ smoothed by the smoothing application unit 13 to obtain the smoothed tool center point sequence $Q_{tcp}(t)$, and a tolerance checking unit 131 that performs tolerance checking on the basis of a difference between the tool center point sequence $P_{tcp}(t)$ before the coordinate-conversion is performed by the kinematic conversion unit 12 and the smoothed tool center point sequence $Q_{tcp}(t)$ obtained by the inverse kinematic conversion unit 130, and preferably determines the predetermined parameter u by means of numerical calculation.

According to the numerical control device 3 according to the present embodiment, applying smoothing to the control point enables smooth motion of the spindle. This makes it possible to prevent the control point from rapidly operating, whereby the cycle time and the machining surface quality can be improved.

Fourth Embodiment

Next, a configuration of the numerical control device 4 will be described with reference to FIG. 8. FIG. 8 is a block diagram illustrating a functional configuration of the numerical control device 4. The present embodiment is different from the third embodiment in that a smoothing application unit 23 that analytically determines a predetermined parameter u is provided instead of the smoothing application unit 13 that determines a predetermined parameter u by means of numerical calculation.

As illustrated in FIG. 8, a CPU (not shown) included in the numerical control device 4 executes various programs to thereby implement various functions of the smoothing application unit 23, and the like.

Next, a process executed by the numerical control device 4 will be described with reference to FIG. 9. FIG. 9 is a flowchart illustrating the process executed by the numerical control device 4.

As illustrated in FIG. 9, the process executed by the numerical control device 4 includes a machining program reading step S10, a kinematic conversion step S12, a smoothing strength calculation step S23, a smoothing application step S14, an interpolation control step S11, and a drive control step S18. The process contents of each step are as described above.

In this way, a numerical control device 4 includes a machining program reading unit 10 that generates, on a basis of a read machining program P, a tool center point sequence $P_{tcp}(t)$ indicating a path of a center point of a tool T of a machining tool A, a kinematic conversion unit 12 that performs coordinate-conversion on the tool center point sequence $P_{tcp}(t)$ generated by the machining program reading unit 10 to obtain a control point sequence $P_{mcn}(t)$ indicating a path of a control point defining a position of the tool T, a smoothing application unit 23 that performs smoothing by performing smoothing processing on the control point sequence $P_{mcn}(t)$, obtained by the kinematic conversion unit 12, with a predetermined parameter u, an interpolation control unit 11 that interpolates the control point sequence $Q_{mcn}(t)$ smoothed by the smoothing application unit 23, and a drive control unit 14 that controls driving of the machining tool A on the basis of the control point sequence $Q_{mcn}(t)$ interpolated by the interpolation control unit 11.

In the numerical control device 4, the smoothing application unit 23 preferably analytically determines the predetermined parameter u.

According to the numerical control device 4 according to the present embodiment, applying smoothing to the control point enables smooth motion of the spindle. This makes it possible to prevent the control point from rapidly operating, whereby the cycle time and the machining surface quality can be improved.

Note that the present disclosure is not limited to each embodiment described above, and various changes and modifications are possible.

For example, the $d_{Max}$ may be obtained by a method different from each embodiment described above. For example, a difference $d(t_1, t_2)$ between $P_{tcp}(t_1)$ and $Q_{tcp}(t_2)$ can be represented as $d(t_1, t_2)=|Q_{tcp}(t_2)-P_{tcp}(t_1)|$. In an arbitrary value $t_1$, $t_2$ that minimizes $d(t_1, t_2)$ is obtained, the value of d at that time is denoted by $d_{-min}(t_1)$. This is because there may be a case where the difference d between $P_{tcp}(t_1)$ and $Q_{tcp}(t_1)$ is not minimized. Then, $t_1$ that maximizes $d_{-min}(t_1)$ is obtained, a value of $d_{-min}$ at that time is denoted by dux.

In the above-described first and third embodiments, the checking of a tolerance $T_{tcp}$ is performed on the basis of the difference $d(t)=|Q_{tcp}(t)-P_{tcp}(t)|$ between the tool center point sequence $P_{tcp}(t)$ and the tool center point sequence $Q_{tcp}(t)$, and the maximum value of u (the maximum value of the smoothing strength) satisfying $d_{Max} \leq T_{tcp}$ is calculated, however, instead of this, the checking of the tolerance $T_{tcp}$ is performed on the basis of difference $d_{tcp}(t)=|Q_{tcp}(t)-P_{tcp}(t)|$ between the tool center point sequence $P_{tcp}(t)$ and the tool center point sequence $Q_{tcp}(t)$ and the checking of a tolerance $T_{mcn}$ is performed on the basis of a difference $d_{mcn}(t)=|Q_{mcn}(t)-P_{mcn}(t)|$ between the control point sequence $P_{mcn}(t)$ and the control point sequence $Q_{mcn}(t)$, so that a maximum value of u (a maximum value of the smoothing strength) satisfying both of $d_{tcp\_Max} \leq T_{tcp}$ and $d_{mcn\_Max} \leq T_{mcn}$ may be calculated.

In this case, the tolerance checking unit 131 performs the tolerance checking not only on the basis of the difference $d_{tcp}(t)$ between the tool center point sequence $P_{tcp}(t)$ before the coordinate-conversion is performed by the kinematic conversion unit 12 and the smoothed tool center point sequence $Q_{tcp}(t)$ obtained by the inverse kinematic conversion unit 130, but also on the basis of the difference $d_{mcn}(t)$ between the control point sequence $P_{mcn}(t)$ before the smoothing is performed by the smoothing application unit 13 and the control point sequence $Q_{mcn}(t)$ smoothed by the smoothing application unit 13.

In the above-described second and fourth embodiments, u satisfying $d_{Max}=T_{tcp}$ where $d_{Max}$ is a maximum value of the difference $d(t)$ between the tool center point sequence $P_{tcp}(t)$ and the tool center point sequence $Q_{tcp}(t)$, however, instead of this, u satisfying both of $d_{tcp\_Max}=T_{tcp}$ and $d_{mcn\_Max}=T_{mcn}$ may be calculated where $d_{tep\_Max}$ is a maximum value of the difference $d_{tcp}(t)$ between the tool center point sequence $P_{tcp}(t)$ and the tool center point sequence $Q_{tcp}(t)$ and $d_{mcn\_Max}$ is a maximum value of the difference $d_{mcn}(t)$ between the control point sequence $P_{mcn}(t)$ and the control point sequence $Q_{mcn}(t)$.

EXPLANATION OF REFERENCE NUMERALS 1, 2, 3, 4 Numerical control device
10 Machining program reading unit
11 Interpolation control unit
12 Kinematic conversion unit
13, 23 Smoothing application unit
130 Inverse kinematic conversion unit
131 Tolerance checking unit
14 Drive control unit
A Machining tool
A1 Servo
A2 Spindle
T Tool
P Machining program
$P_{tcp}(t)$ Tool center point sequence
$P_{mcn}(t)$ Control point sequence
S10 Machining program reading step
S11 Interpolation control step
S12 Kinematic conversion step
S13 Smoothing strength setting step
S14 Smoothing application step
S15 Inverse kinematic conversion step
S16 Tolerance checking step
S18 Drive control step
S23 Smoothing strength calculation step

The invention claimed is:

1. A numerical control device, comprising:
a processor configured to function as:
   a machining program reading unit that generates, on a basis of a read machining program, a tip point sequence indicating a path of a tip point of a tool of a machining tool;
   an interpolation control unit that interpolates the tip point sequence generated by the machining program reading unit;
   a kinematic conversion unit that performs coordinate-conversion on the tip point sequence interpolated by the interpolation control unit to obtain a control point sequence indicating a path of a control point defining a position of the tool;
   a smoothing application unit that performs smoothing by performing smoothing processing on the control point sequence, obtained by the kinematic conversion unit, with a predetermined parameter; and
   a drive control unit that controls driving of the machining tool on the basis of the control point sequence smoothed by the smoothing application unit,
wherein the smoothing application unit includes:
   an inverse kinematic conversion unit that performs coordinate-conversion on the control point sequence smoothed by the smoothing application unit to obtain the smoothed tip point sequence; and
   a tolerance checking unit that performs checking whether a maximum value of a difference between the tip point sequence before the coordinate-conversion is performed by the kinematic conversion unit and the smoothed tip point sequence obtained by the inverse kinematic conversion unit is equal to or less than a predetermined threshold value, and determines the predetermined parameter by means of numerical calculation so that the maximum value of the difference is equal to or less than the threshold value.

2. The numerical control device according to claim 1, wherein the tolerance checking unit performs checking whether a maximum value of a difference between the control point sequence before the smoothing is performed by the smoothing application unit and the control point sequence smoothed by the smoothing application unit is equal to or less than a predetermined threshold value.

3. A numerical control device, comprising:
a processor configured to function as:
   a machining program reading unit that generates, on a basis of a read machining program, a tip point sequence indicating a path of a tip point of a tool of a machining tool;
   a kinematic conversion unit that performs coordinate-conversion on the tip point sequence generated by the machining program reading unit to obtain a control point sequence indicating a path of a control point defining a position of the tool;
   a smoothing application unit that performs smoothing by performing smoothing processing on the control point sequence, obtained by the kinematic conversion unit, with a predetermined parameter;
   an interpolation control unit that interpolates the control point sequence smoothed by the smoothing application unit; and
   a drive control unit that controls driving of the machining tool on the basis of the control point sequence interpolated by the interpolation control unit,
wherein
the smoothing application unit includes:
   an inverse kinematic conversion unit that performs coordinate-conversion on the control point sequence interpolated by the interpolation control unit to obtain the smoothed tip point sequence; and
   a tolerance checking unit that performs checking whether a maximum value of a difference between the tip point sequence before the coordinate-conversion is performed by the kinematic conversion unit and the smoothed tip point sequence obtained by the inverse kinematic conversion unit is equal to or less than a predetermined threshold value, and determines the predetermined parameter by means of numerical calculation so that the maximum value of the difference is equal to or less than the threshold value.

4. The numerical control device according to claim 3, wherein the tolerance checking unit performs checking whether a maximum value of a difference between the control point sequence before the smoothing is performed by the smoothing application unit and the control point sequence smoothed by the smoothing application unit is equal to or less than a predetermined threshold value.

5. A numerical control device, comprising:
a processor configured to function as:
   a machining program reading unit that generates, on a basis of a read machining program, a tip point sequence indicating a path of a tip point of a tool of a machining tool;
   an interpolation control unit that interpolates the tip point sequence generated by the machining program reading unit;
   a kinematic conversion unit that performs coordinate-conversion on the tip point sequence interpolated by the interpolation control unit to obtain a control point sequence indicating a path of a control point defining a position of the tool;
   a smoothing application unit that performs smoothing by performing smoothing processing on the control point sequence, obtained by the kinematic conversion unit, with a predetermined parameter; and
   a drive control unit that controls driving of the machining tool on the basis of the control point sequence smoothed by the smoothing application unit,
wherein the smoothing application unit includes:
   an inverse kinematic conversion unit that performs coordinate-conversion on the control point sequence smoothed by the smoothing application unit to obtain the smoothed tip point sequence and analytically determines the predetermined parameter so that a maximum value of a difference between the tip point sequence interpolated by the interpolation control unit before the coordinate-conversion is performed by the kinematic conversion unit and the smoothed tip point sequence obtained by the inverse kinematic conversion unit corresponds to a predetermined threshold value.

* * * * *